(12) United States Patent
Guo et al.

(10) Patent No.: US 12,137,375 B2
(45) Date of Patent: Nov. 5, 2024

(54) DUPLICATION OF PACKETS ASSOCIATED WITH DIRECTIONAL RANGES

(71) Applicant: QUALCOMM Incorporated, San Diego, CA (US)

(72) Inventors: Hui Guo, Beijing (CN); Kapil Gulati, Belle Mead, NJ (US); Junyi Li, Fairless Hills, PA (US); Sourjya Dutta, San Diego, CA (US); Shuanshuan Wu, San Diego, CA (US); Min Huang, Beijing (CN); Gabi Sarkis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 35 days.

(21) Appl. No.: 18/004,843

(22) PCT Filed: Aug. 31, 2020

(86) PCT No.: PCT/CN2020/112413
§ 371 (c)(1),
(2) Date: Jan. 9, 2023

(87) PCT Pub. No.: WO2022/041181
PCT Pub. Date: Mar. 3, 2022

(65) Prior Publication Data
US 2023/0188262 A1    Jun. 15, 2023

(51) Int. Cl.
*H04W 28/08* (2023.01)
*H04L 1/08* (2006.01)

(52) U.S. Cl.
CPC .......... *H04W 28/0967* (2020.05); *H04L 1/08* (2013.01); *H04W 28/0992* (2020.05)

(58) Field of Classification Search
CPC .................................................. H04W 28/0967
See application file for complete search history.

(56) References Cited

U.S. PATENT DOCUMENTS

| 2018/0124771 A1* | 5/2018 | Mok | H04W 72/51 |
| 2018/0160418 A1* | 6/2018 | Luo | H04W 72/1263 |
| 2021/0067970 A1* | 3/2021 | Huang | H04W 12/108 |

(Continued)

FOREIGN PATENT DOCUMENTS

| CN | 106488584 B * | 2/2020 |
| WO | 2019185830 A1 | 10/2019 |

(Continued)

OTHER PUBLICATIONS

Ericsson: "Clarification of Service Data for PC5", 3GPP TSG-SA WG2 Meeting# 138E , S2-2002853, Apr. 24, 2020 (Apr. 24, 2020), 4 Pages, the whole document.

(Continued)

*Primary Examiner* — Joseph D Torres
(74) *Attorney, Agent, or Firm* — Harrity & Harrity, LLP

(57) ABSTRACT

A wireless communication system comprising a user equipment (UE) component configured to receive a vehicle-to-everything (V2X) packet. The UE component is configured to duplicate the V2X packet to form a plurality of duplicated V2X packets at a protocol stack layer of the UE component, wherein each duplicated V2X packet is associated with a directional range.

35 Claims, 12 Drawing Sheets

(56) References Cited

U.S. PATENT DOCUMENTS

2021/0350709 A1   11/2021   Li et al.

FOREIGN PATENT DOCUMENTS

WO        2020028070        2/2020
WO    WO-2020107737 A1    6/2020

OTHER PUBLICATIONS

International Search Report and Written Opinion—PCT/CN2020/112413—ISA/EPO—May 27, 2021.
LG Electronics Inc: "Consideration on Packet Duplication", 3GPP TSG-RAN2 #100, R2-1713823, Dec. 1, 2017 (Dec. 1, 2017), 2 Pages, section 2.
Samsung: "TS 23.287 V0.4 Clarification of PFI for Different Comm. Modes", 3GPP TSG-SA WG2 Meeting #134, 62-1907732, Jun. 28, 2019 (Jun. 28, 2019), 4 Pages, the whole document.
Jacob R., et al., Hybrid V2X Communications: Multi-RAT as Enabler for X Connected Autonomous Driving, 2018 IEEE Th Annual International Symposium on Personal, Indoor and Mobile Radio Communications (PIMRC), Sep. 9, 2018, pp. 1370-1376, XP033479596, Doi: 10.1109/PIMRC.2018.8580953.
Supplementary European Search Report—EP20950850—Search Authority—The Hague—Dec. 14, 2023.

* cited by examiner

DUPLICATION OF PACKETS ASSOCIATED WITH DIRECTIONAL RANGES

CROSS-REFERENCE TO RELATED APPLICATION

This Patent Application is a 371 of Patent Cooperation Treaty (PCT) Patent Application No. PCT/CN2020/112413, filed Aug. 31, 2020, entitled "DUPLICATION OF PACKETS ASSOCIATED WITH DIRECTIONAL RANGES," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for duplication of packets associated with directional ranges.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: receiving a vehicle-to-everything (V2X) packet; and duplicating, at a protocol stack layer of the UE, the V2X packet to form a plurality of duplicated V2X packets, wherein each duplicated V2X packet is associated with a directional range.

In some aspects, a UE for wireless communication includes a memory and one or more processors operatively coupled to the memory, the memory and the one or more processors configured to: receive a V2X packet; and duplicate, at a protocol stack layer of the UE, the V2X packet to form a plurality of duplicated V2X packets, wherein each duplicated V2X packet is associated with a directional range.

In some aspects, a non-transitory computer-readable medium storing a set of instructions for wireless communication includes one or more instructions that, when executed by one or more processors of a UE, cause the UE to: receive a V2X packet; and duplicate, at a protocol stack layer of the UE, the V2X packet to form a plurality of duplicated V2X packets, wherein each duplicated V2X packet is associated with a directional range.

In some aspects, an apparatus for wireless communication includes: means for receiving a V2X packet; and means for duplicating, at a protocol stack layer of the apparatus, the V2X packet to form a plurality of duplicated V2X packets, wherein each duplicated V2X packet is associated with a directional range.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
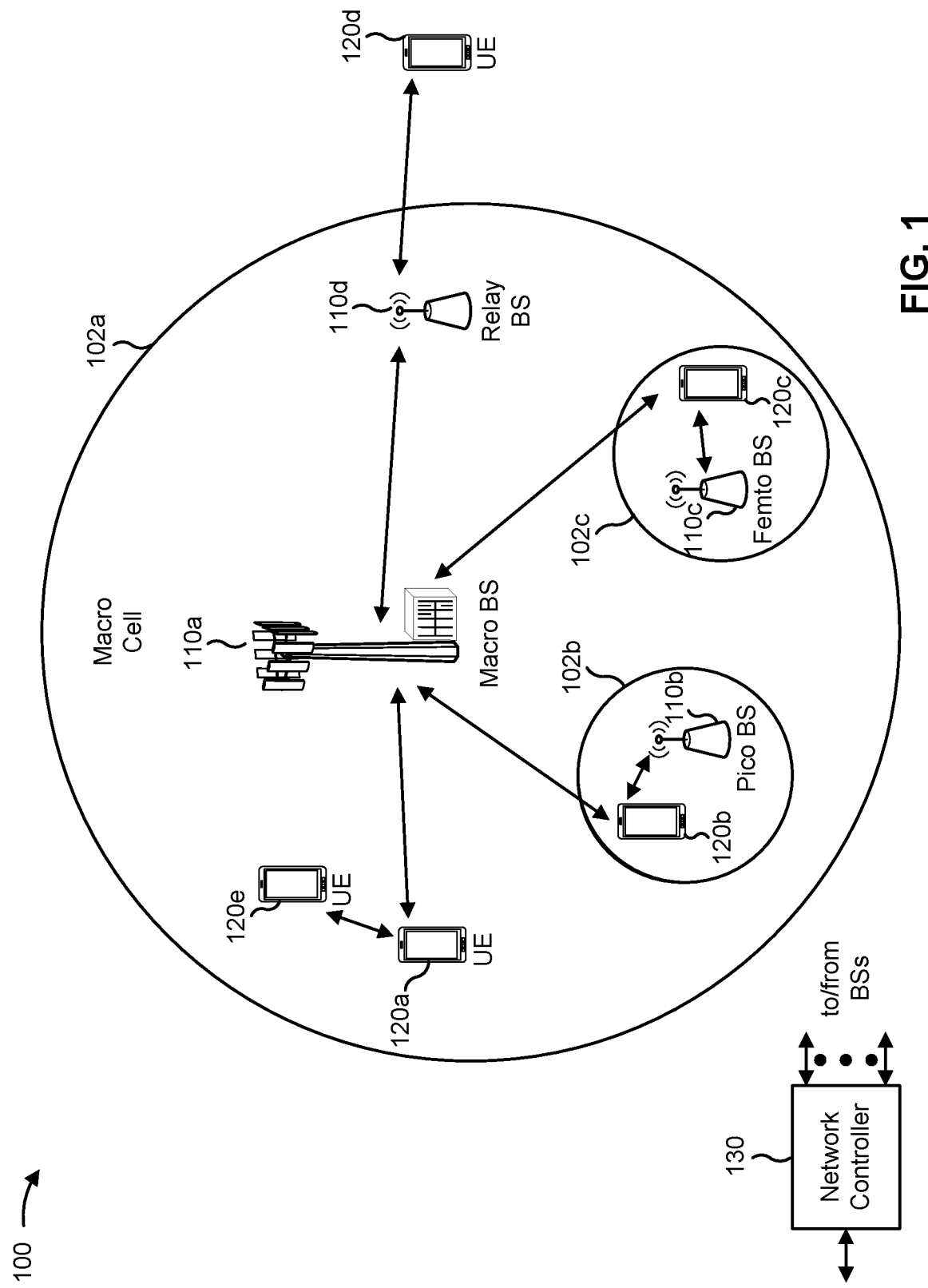
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
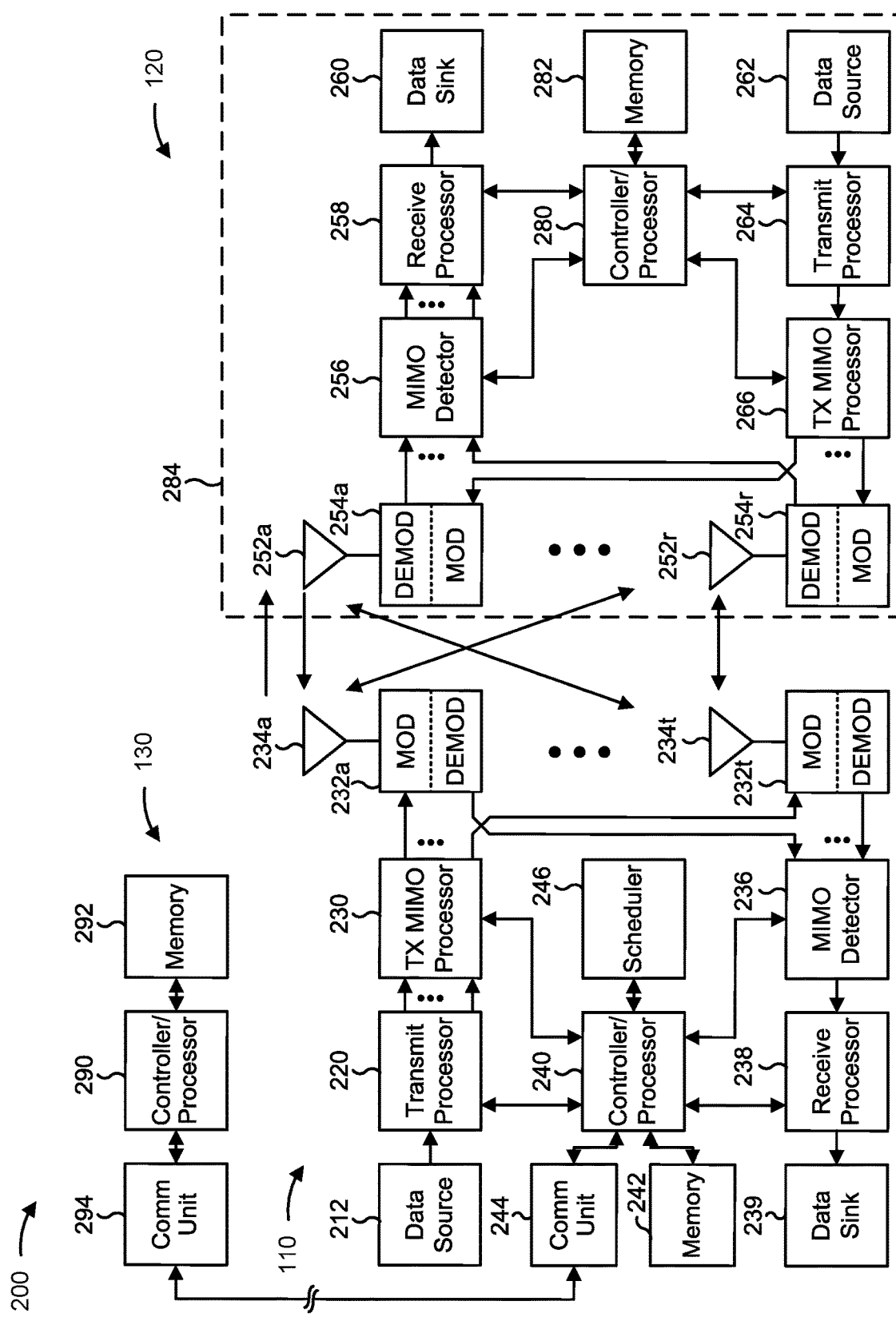
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-12.

Controller/processor 240 of base station 110, controller/processor 280 of UE 120, and/or any other component(s) of FIG. 2 may perform one or more techniques associated with duplication of packets associated with directional ranges, as described in more detail elsewhere herein. For example, controller/processor 240 of base station 110, controller/processor 280 of UE 120, and/or any other component(s) of FIG. 2 may perform or direct operations of, for example, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1200 of FIG. 12, and/or other processes as described herein. In some aspects, executing instructions may include running the instructions, converting the instructions, compiling the instructions, interpreting the instructions, and/or the like.

In some aspects, a UE (e.g., UE 120) may include means for receiving a V2X packet, means for duplicating, at a protocol stack layer of the UE, the V2X packet to form a plurality of duplicated V2X packets, wherein each duplicated V2X packet is associated with a directional range, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Sidelink communication (e.g., V2X communication) may be performed between UEs (e.g., vehicles). Vehicles may be equipped with mTRPs, which may improve reliability, coverage, and capacity performance through flexible deployment scenarios. Further, mTRPs may improve reliability in safety and other high robustness and throughput desired applications.

Figure 3:
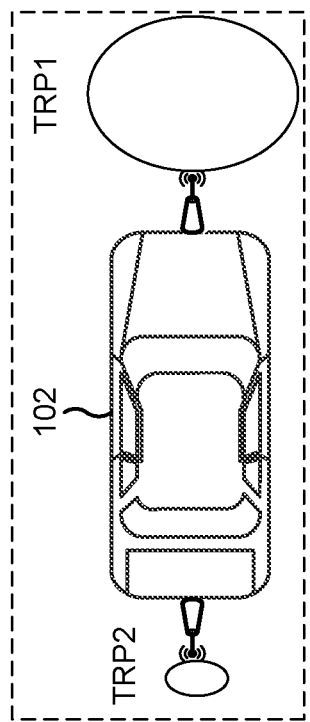
FIG. 3 is a diagram illustrating an example of a data transmission with multiple transmission and reception points (mTRP), in accordance with various aspects of the present disclosure.

FIG. 3 is a diagram illustrating an example 300 of a data transmission with mTRP, in accordance with various aspects of the present disclosure.

As shown in FIG. 3, a UE 102 associated with a vehicle may transmit data to multiple TRPs in an mTRP scenario. For example, the UE 102 may transmit data that is received at a first TRP (TRP1) and a second TRP (TRP2). The first TRP may be in a first direction relative to the UE 102, and the second TRP may be at a second direction relative to the UE 102. In this particular example, the first TRP may be located at a front-side direction relative to the UE 102, and the second TRP may be located at a rear-side direction relative to the UE 102.

In some cases, side coverage for the UE 102 may be less important in certain scenarios. Transmissions from the UE 102 may be biased in the front-side direction and/or rear-side direction depending on a packet content, packet type, deployment scenario, and/or the like. In this particular example, data transmissions from the UE 102 may be more biased toward the front-side as compared to the rear-side.

As indicated above, FIG. 3 is provided as an example. Other examples may differ from what is described with regard to FIG. 3.

Figure 4:
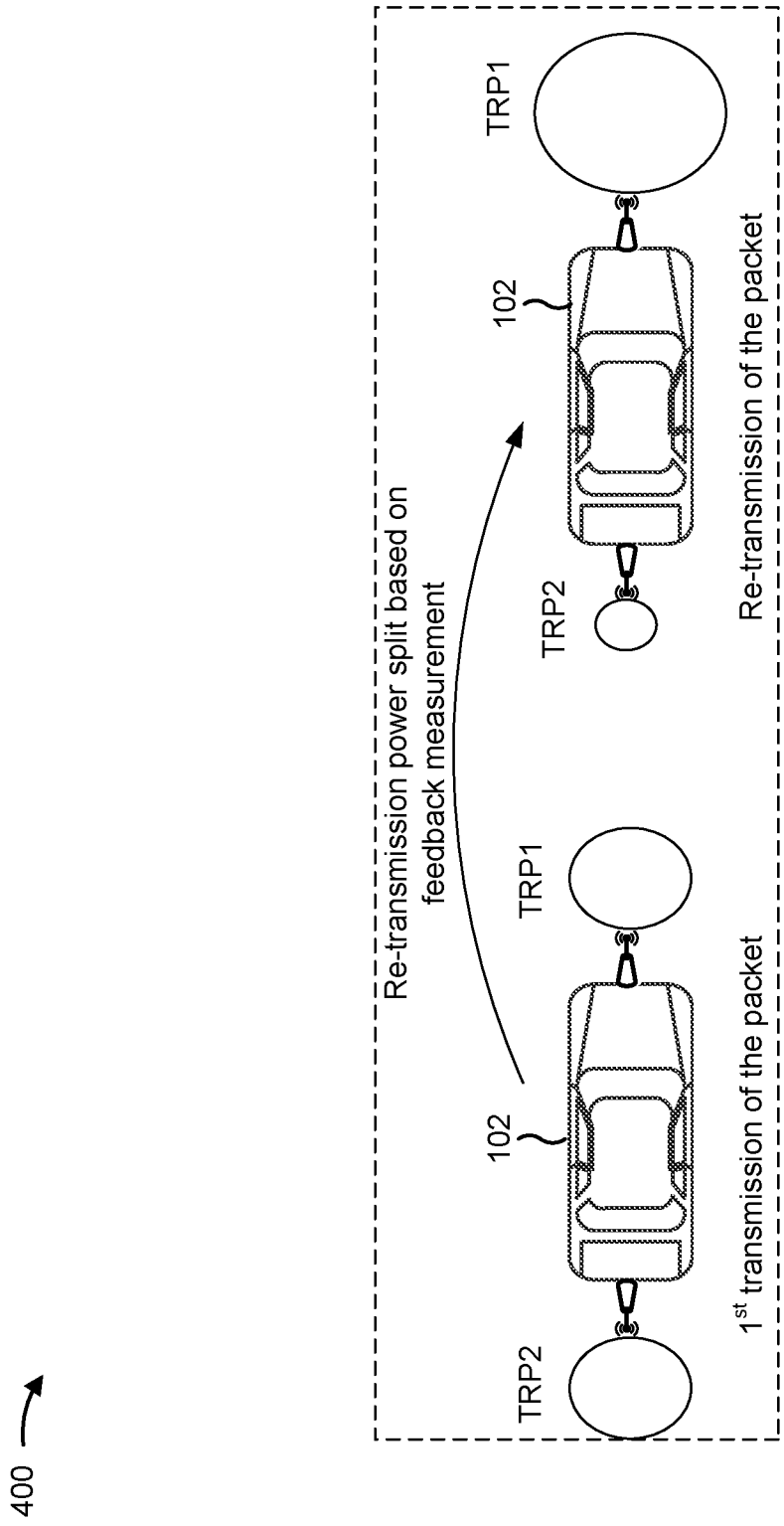
FIG. 4 is a diagram illustrating an example of a data transmission and a data retransmission with mTRP, in accordance with various aspects of the present disclosure.

FIG. 4 is a diagram illustrating an example 400 of a data transmission and a data retransmission with mTRP, in accordance with various aspects of the present disclosure.

As shown in FIG. 4, a UE 102 associated with a vehicle may transmit a V2X packet that is received at a first TRP (TRP1) and a second TRP (TRP2). The UE 102 may transmit the V2X packet with an aim to achieve 360-degree coverage for improved control reception. In some cases, at a later time, the UE 102 may retransmit the V2X packet. The retransmitted V2X packet may be received at the first TRP and the second TRP. The retransmission of the V2X packet may be biased toward the front-side of the UE 102, as the front-side of the UE 102 may have an increased priority as compared to the rear-side of the UE 102.

As indicated above, FIG. 4 is provided as an example. Other examples may differ from what is described with regard to FIG. 4.

Figure 5:
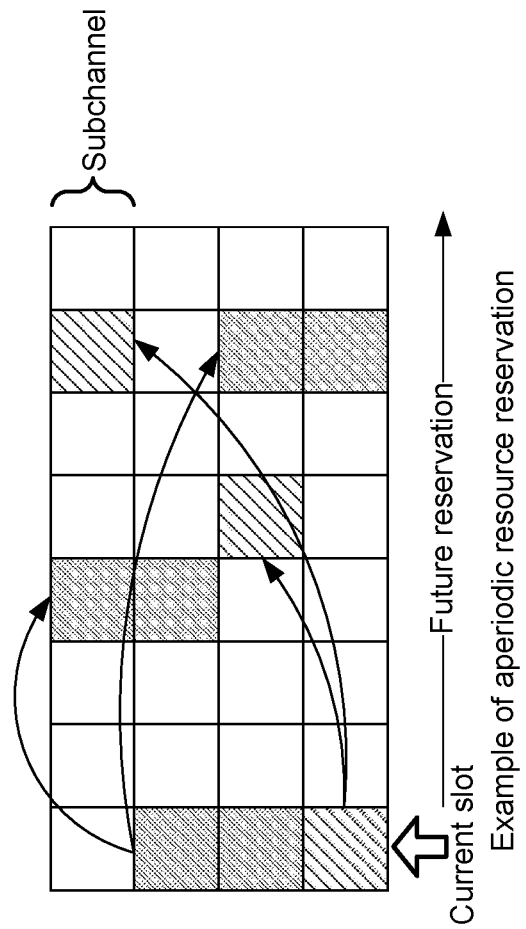
FIG. 5 is a diagram illustrating an example of an aperiodic resource reservation, in accordance with various aspects of the present disclosure.

FIG. 5 is a diagram illustrating an example 500 of an aperiodic resource reservation, in accordance with various aspects of the present disclosure.

Sidelink control information (SCI) may carry resource reservation information. The SCI may be transmitted from a first UE to a second UE over a sidelink interface. The resource reservation information may be transmitted periodically or aperiodically from the first UE.

As shown in FIG. 5, resource reservation information may reserve a sidelink resource in a current slot (in which the resource reservation information is transmitted) and in up to two slots that occur later in time. The resource reservation information may define a resource allocation in units of sub-channels in a frequency domain. The resource allocation may be limited to one slot in a time domain.

The SCI may be first-stage SCI that is transmitted from the first UE in accordance with an SCI format 0-1. The SCI may include a priority value, such as a quality of service (QOS) value. The SCI may include a physical sidelink shared channel (PSSCH) resource assignment, which may define a frequency and time resource for the PSSCH. The SCI may include a resource reservation period. The SCI may include a PSSCH DMRS pattern when a plurality of PSSCH DMRS patterns are pre-configured. The SCI may include a second-stage SCI format, which may include information related to a size of second-stage SCI. The SCI may include a 2-bit beta offset indicator for a control resource allocation associated with the second-stage SCI. The SCI may include a 1-bit field that indicates a number of PSSCH DMRS ports. The SCI may include a 5-bit field that indicates an MCS. The SCI may not include a transmission configuration indicator (TCI) state (e.g., no TCI state indication for the first-stage SCI).

As indicated above, FIG. 5 is provided as an example. Other examples may differ from what is described with regard to FIG. 5.

Figure 6:
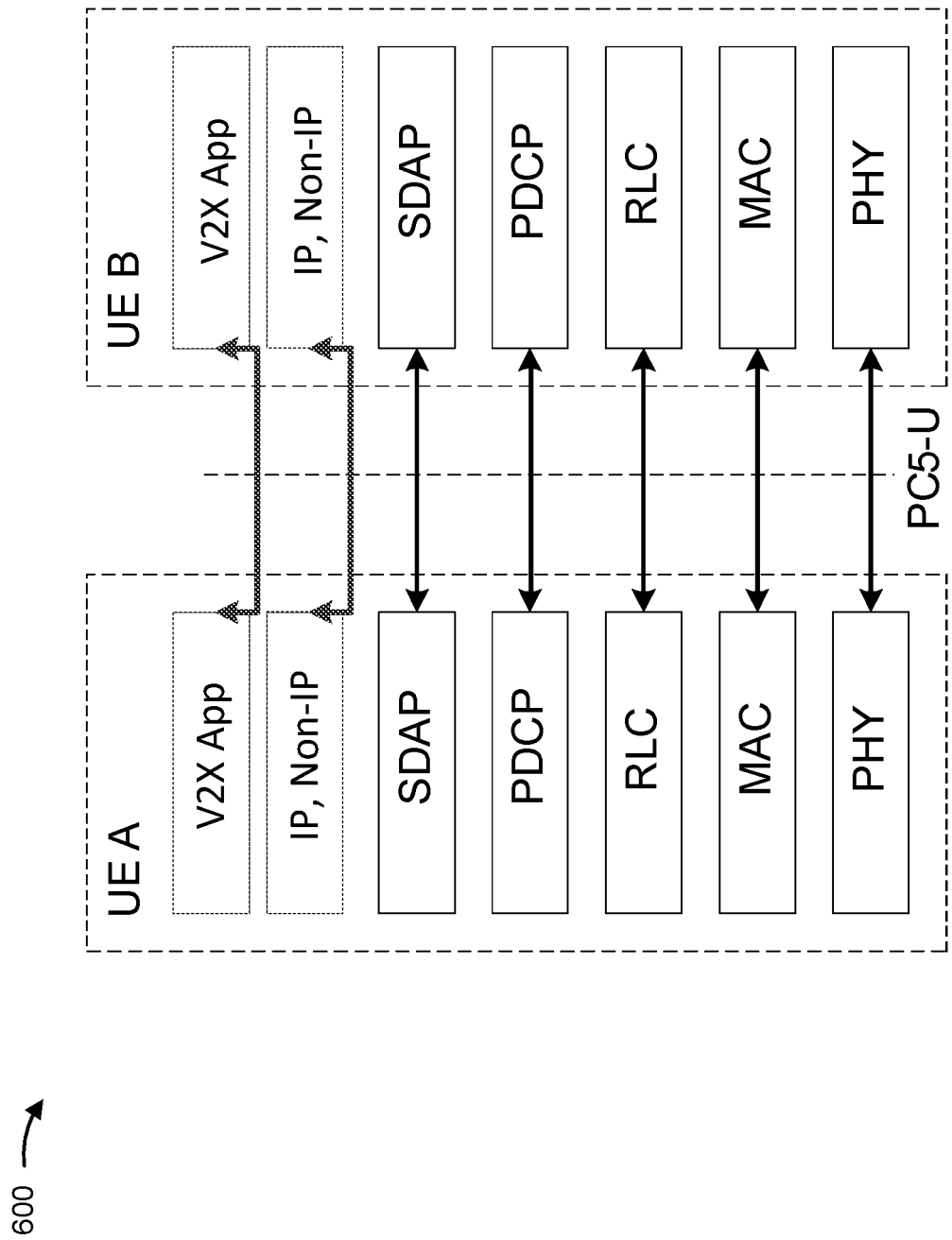
FIG. 6 is a diagram illustrating an example of a user plane protocol stack, in accordance with various aspects of the present disclosure.

FIG. 6 is a diagram illustrating an example 600 of a user plane protocol stack, in accordance with various aspects of the present disclosure.

As shown in FIG. 6, a first UE (UE A) and a second UE (UE B) may communicate via a user plane for an NR PC5 reference point, also referred to as a PC5 user plane protocol stack. The NR PC5 reference point may include, for the first UE and the second UE, a V2X application (V2X App) layer, a service data adaptation protocol (SDAP) layer, a packet data convergence protocol (PDCP) layer, a radio link control (RLC) layer, a media access control (MAC) layer, and a physical (PHY) layer. Internet protocol (IP) and non-IP PDCP service data unit (SDU) types may be supported for V2X communications over the NR PC5 reference point.

As indicated above, FIG. 6 is provided as an example. Other examples may differ from what is described with regard to FIG. 6.

Figure 7:
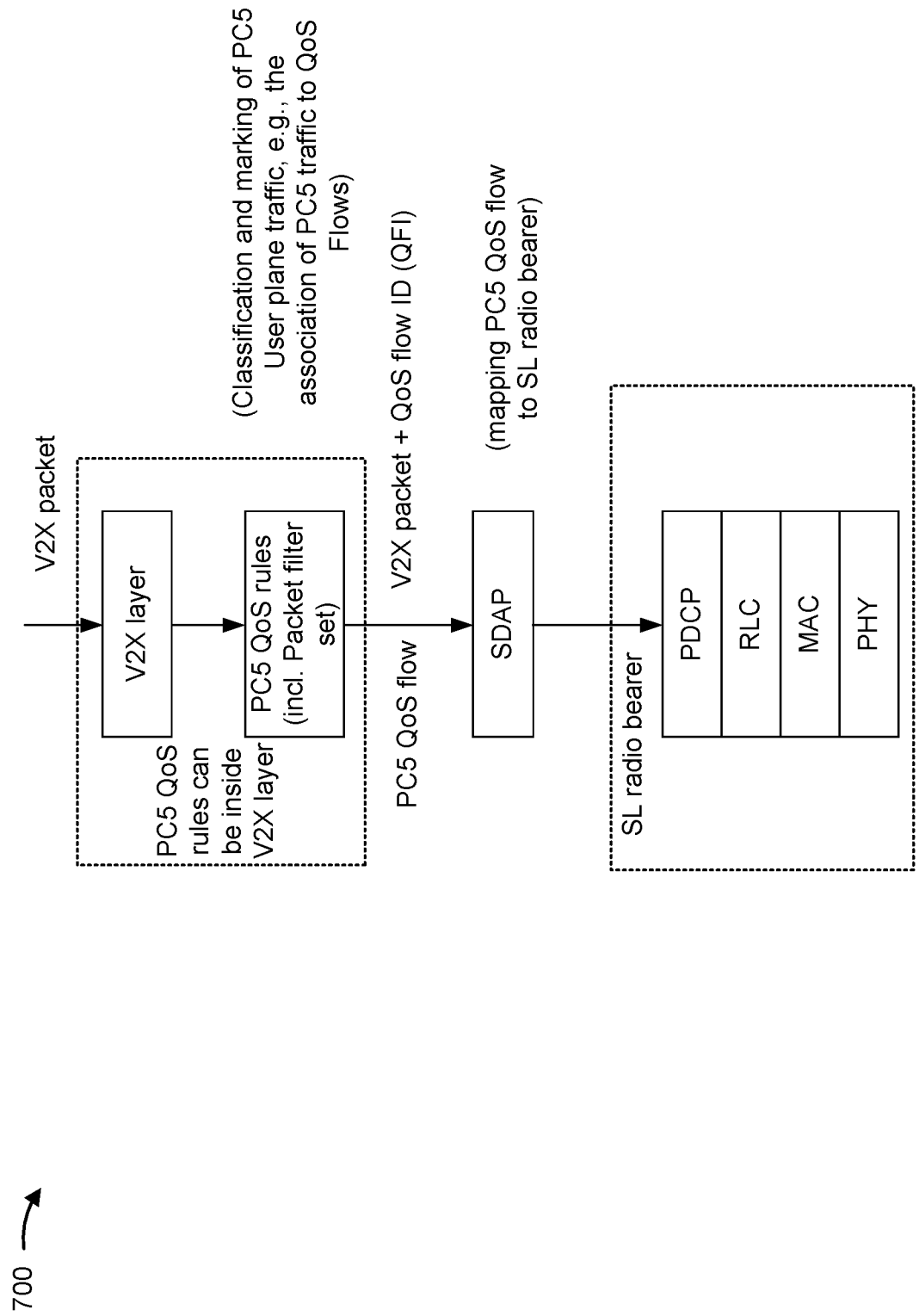
FIG. 7 is a diagram illustrating an example of a quality of service handling for a packet, in accordance with various aspects of the present disclosure.

FIG. 7 is a diagram illustrating an example 700 of a quality of service handling for a packet, in accordance with various aspects of the present disclosure.

Quality of service (QOS) handling may be performed for V2X communications over an NR PC5 reference point. As shown in FIG. 7, a V2X packet may be received at a V2X layer. The V2X layer may be included in a protocol stack of a UE. The V2X layer may communicate with a V2X application layer of the UE. A PC5 QoS flow, which may be associated with PC5 QoS rules(s) and QoS parameters, may be applied to the V2X packet. The V2X packet and a corresponding QoS flow identifier (QFI) may be provided to the SDAP layer, at which the PC5 QoS flow may be mapped to a sidelink radio bearer. The sidelink radio bearer may be associated with a PDCP layer, an RLC layer, a MAC layer, and a PHY layer.

The V2X layer may indicate the QoS parameters associated with the V2X packet. The QoS parameters may include QoS parameters that are mapped to a PC5 QoS identifier (PQI) on a per PC5 QoS flow basis, and/or QoS parameters for dynamic control on a per-packet basis. The QoS parameters may include a resource type, such as guaranteed bit rate (GBR), delay critical GBR, or non-GBR. The QoS parameters may include a priority level. The QoS parameters may include a packet delay budget. The QoS parameters may include a packet error rate. The QoS parameters may include an averaging window for a GBR and delay-critical GBR resource type. The QoS parameters may include a maximum data burst volume for a delay-critical GBR resource type. The QoS parameters may include a range parameter for a V2X groupcast transmission, where the range parameter may indicate a minimum distance for which the QoS parameters are to be fulfilled. The QoS parameters may not include a directional indication.

As indicated above, FIG. 7 is provided as an example. Other examples may differ from what is described with regard to FIG. 7.

In an mTRP scenario, a UE (e.g., a vehicle) may transmit and/or retransmit V2X packets with a certain bias, as TRPs that are configured to receive the V2X packets may be located in different directions relative to the UE, and the TRPs may each be associated with different priority levels. The UE may benefit by applying different transmission parameters (e.g., different precoders) for the V2X packet transmissions (or retransmissions) depending on the various directionalities of the TRPs relative to the UE. However, past solutions do not enable the UE to apply different transmission parameters (e.g., precoder variation) to V2X packet transmissions (or retransmissions) depending on the various directionalities of the TRPs relative to the UE.

In various aspects of techniques and apparatuses described herein, a UE may provide a received V2X packet to a protocol stack layer of the UE. The V2X packet may be duplicated, at the protocol stack layer of the UE, to form a plurality of duplicated V2X packets. A duplicated V2X packet may be associated with a directional range. The directional range may correspond to a directionality of a TRP. A transmission parameter (e.g., a precoder) for the duplicated V2X packet may be selected based at least in part on the directional range associated with the duplicated V2X packet. As a result, each duplicated V2X packet may be transmitted or retransmitted in accordance with a transmission parameter (e.g., a precoder) that is selected based at least in part on a directionality of the TRP.

Figure 8:
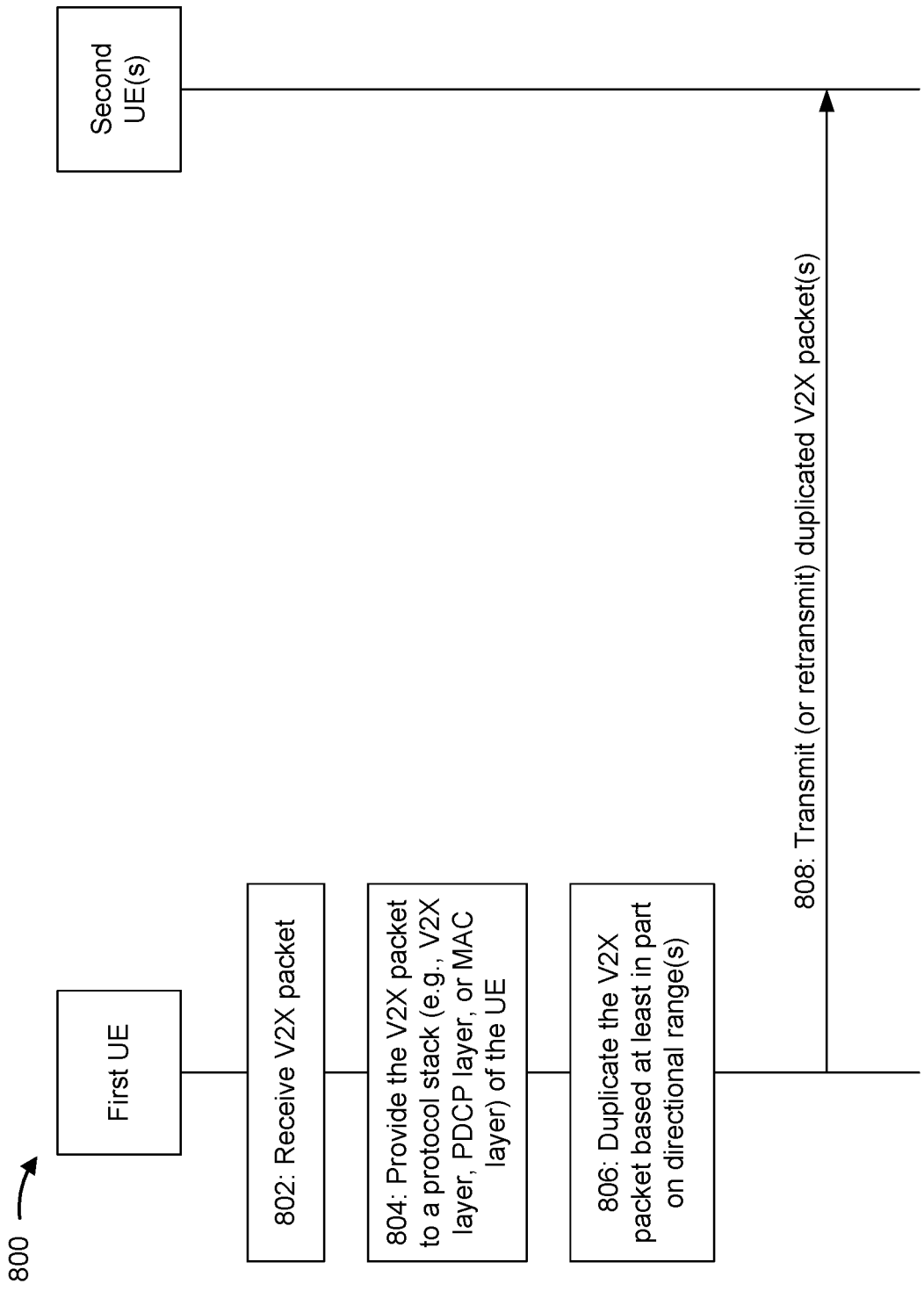
FIGS. 8-11 are diagrams illustrating examples associated with duplication of packets associated with directional ranges, in accordance with various aspects of the present disclosure.

FIG. 8 is a diagram illustrating an example 800 associated with duplication of packets associated with directional ranges, in accordance with various aspects of the present disclosure. As shown in FIG. 8, example 800 includes communication between a first UE (e.g., UE 120a) and a second UE (e.g., UE 120e). In some aspects, the first UE and the second UE may be included in a wireless network such as wireless network 100. The first UE and the second UE may communicate on a wireless sidelink.

As shown by reference number 802, a first UE may receive a V2X packet. A "V2X packet", as described herein, may refer to a complete V2X packet, a portion of a V2X packet, V2X packet data, and/or the like. The V2X packet may be received for transmission to the second UE(s).

As shown by reference number 804, the V2X packet may be provided to a protocol stack layer of the first UE. In some aspects, the V2X packet may be provided to a V2X layer of the first UE. In some aspects, the V2X packet may be provided to a PDCP layer of the first UE. In some aspects, the V2X packet may be provided to a MAC layer of the first UE. In some aspects, the V2X packet may be provided to other protocol stack layers of the first UE.

In some aspects, the V2X packet may be directly provided as data to the protocol stack layer of the first UE. In some aspects, the V2X packet may be indirectly provided (e.g., via accessible memory) to the protocol stack layer of the first UE. In other words, the V2X packet may be provided to the protocol stack layer of the first UE based at least in part on a push mechanism and/or a pull mechanism. In some aspects, the V2X packet may be provided (directly or indirectly) from a first protocol stack layer of the first UE to a second protocol stack layer of the first UE, where the second protocol stack layer may include a V2X layer, a PDCP layer, a MAC layer, and/or the like.

As shown by reference number 806, the V2X packet may be duplicated at the protocol stack layer of the UE to form a plurality of duplicated V2X packets. A duplicated V2X packet may be associated with a directional range, and different duplicated V2X packets may be associated with different directional ranges. In some aspects, the V2X packet may be duplicated at the V2X layer to form the plurality of duplicated V2X packets. In some aspects, the V2X packet may be duplicated at the PDCP layer to form the plurality of duplicated V2X packets. In some aspects, the V2X packet may be duplicated at the MAC layer to form the plurality of duplicated V2X packets.

In some aspects, the V2X layer may be duplicated at another protocol stack layer of the first UE to form the plurality of V2X packets. In other words, duplication of the V2X packet at the V2X layer, the PDCP layer, and/or the MAC layer of the first UE is not intended to be limiting.

In some aspects, when the V2X packet is duplicated at the V2X layer, the V2X layer may provide the plurality of duplicated V2X packets to different PFIs, where each PFI may be associated with a set of QoS parameters and a directional range. The set of QoS parameters may include a packet priority, reliability, latency, and/or the like for the directional range. The V2X packet may be duplicated to different PFIs to differentiate a directional importance of the V2X packets.

In some aspects, when the V2X packet is duplicated at the PDCP layer, the V2X packets may be duplicated with different directional range indications. The V2X packet may be duplicated at the PDCP layer when dynamic per-packet range is enabled for the first UE. In this case, the duplicated V2X packet may be a duplicated PDCP SDU from a same PQI, but may be associated with a unique directional range.

In some aspects, when the V2X packet is duplicated at the MAC layer, the first UE may perform hybrid automatic repeat request (HARQ) feedback for the duplicated V2X packets. The first UE may transmit the HARQ feedback based at least in part on the directional range associated with the duplicated V2X packets. In some cases, the first UE may perform HARQ combining for the HARQ feedback associated with the duplicated V2X packets. The duplicated V2X packet may be duplicated MAC SDUs having different directional ranges, which allow the HARQ combining to be performed. The HARQ combining may be performed for the duplicated V2X packets that are associated with different transmission parameters (e.g., different precoders). In some aspects, the duplicated V2X packets may be associated with a MAC PDU group, and the first UE may combine HARQ feedback among one or more HARQ processes associated with the MAC PDU group, where a separate HARQ process may be assigned for each directional range associated with the duplicated V2X packets. The first UE may determine to perform HARQ combining for the MAC PDU group based at least in part on an indication received via an upper layer of the first UE.

In some aspects, a PFI may be associated with a unique set of QoS parameters and a unique directional range. As an example, the different PFIs may include a first PFI associated with a first directional range and a second PFI associated with a second directional range. The first directional range may be associated with a first direction of the first UE, and the second directional range may be associated with a second direction of the first UE. The first direction and the second direction may include a front-side direction, a rear-side direction, a left-side direction, a right-side direction, and/or the like.

In some aspects, the first UE may select the protocol stack layer to duplicate the V2X packet based at least in part on a directional priority associated with the V2X packet and/or when HARQ combining is to be performed by the first UE for the duplicated V2X packets. In other words, depending on the directional priority associated with the V2X packet and/or HARQ combining, the first UE may duplicate the V2X packet at the V2X layer, the PDCP layer, or the MAC layer.

In some aspects, the first UE may select the protocol stack layer to duplicate the V2X packet based at least in part on an application requirement and/or whether HARQ combining is to be performed at the first UE. In some aspects, the V2X packet may be duplicated at the V2X layer when each transmission (or retransmission) direction is associated with different packet priority, latency, reliability, and/or the like. In this case, the V2X packet may be duplicated to corresponding QoS flows of each direction. In some aspects, the V2X packet may be duplicated at the PDCP layer when each transmission (or retransmission) direction is associated with a same packet priority, latency, reliability, and/or the like, and dynamic-per-packet range is supported at the first UE. In this case, the PDCP layer may duplicate a same V2X packet to various PDCP PDUs, where each PDCP PDU may be associated with a specific directional range. In some aspects, the V2X packet may be duplicated at the MAC layer when HARQ combining is to be performed at the MAC layer of the first UE. In this case, the V2X packet may be duplicated to form duplicated MAC PDUs. The duplicated MAC PDUs may be tagged as belonging to a same MAC PDU group, and HARQ combining may be performed among HARQ processes within that MAC PDU group.

In some aspects, irrespective of whether the V2X packet is duplicated at the V2X layer, the PDCP layer, or the MAC layer, the first UE may apply different transmission parameters (e.g., precoder variation) to the duplicated V2X packets based at least in part on directional ranges (or directionalities) associated with each of the duplicated V2X packets.

As shown by reference number 808, the first UE may transmit (or retransmit) the duplicated V2X packets to the second UE(s). A duplicated V2X packet may be transmitted to the second UE(s) in accordance with one or more transmission parameters. The one or more transmission parameters may include a precoder, power split information, and/or the like. The one or more transmission parameters may be selected by the first UE based at least in part on the directional range associated with the duplicated V2X packet. In other words, the first UE may vary the transmission parameters (e.g., perform precoder variation) depending on the directional range associated with the duplicated V2X packet.

As indicated above, FIG. 8 is provided as an example. Other examples may differ from what is described with regard to FIG. 8.

Figure 9:
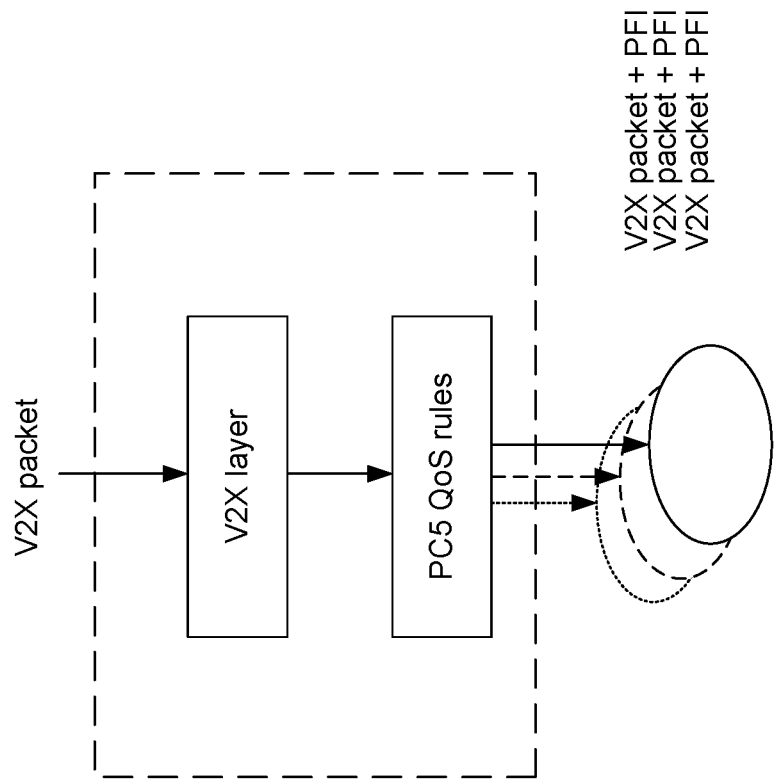

FIG. 9 is a diagram illustrating an example 900 associated with duplication of packets associated with directional ranges, in accordance with various aspects of the present disclosure.

As shown in FIG. 9, a V2X packet may be received at a V2X layer of a UE. The V2X layer may receive the V2X packet, a V2X service type, and/or a V2X application requirement from a V2X application layer. The V2X layer may duplicate a same V2X packet and/or V2X service to different PFIs to differentiate a directional importance of the V2X packet. The V2X packet may be mapped to different PFIs associated with different PC5 QOS flows. The different PFIs may be associated with PC5 QOS rules. A PFI may be associated with unique QoS parameters, such as PQI, directional range, and/or the like. The PFI may be associated with a unique directional range. Different PFIs may be associated with different QoS characteristics, such as packet priority, latency requirements, and/or the like in an associated directional range. The PFIs may be associated with a same V2X service type.

As an example, a V2X packet may be duplicated using a first PFI to form a first duplicated V2X packet. The V2X packet may be duplicated using a second PFI to form a second duplicated V2X packet. The first duplicated V2X packet may be associated with a first directional range (e.g., a front-side direction), a first reliability requirement, and a first priority requirement. The second duplicated V2X packet may be associated with a second directional range (e.g., a rear-side direction), a second reliability requirement, and a second priority requirement. In this example, each duplicated V2X packet may be associated with unique QoS characteristics and a unique directional range.

As indicated above, FIG. 9 is provided as an example. Other examples may differ from what is described with regard to FIG. 9.

Figure 10:
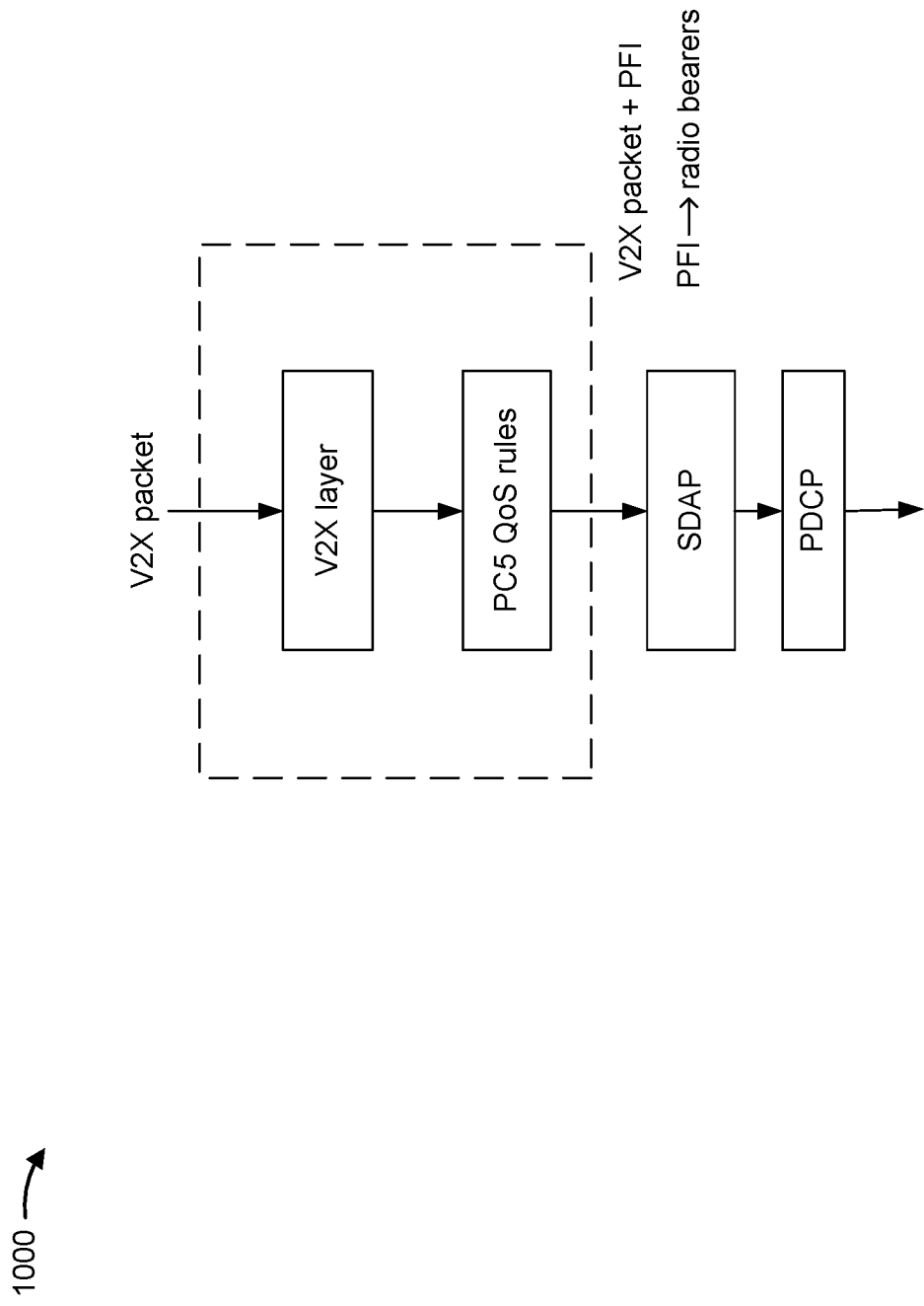

FIG. 10 is a diagram illustrating an example 1000 associated with duplication of packets associated with directional ranges, in accordance with various aspects of the present disclosure.

As shown in FIG. 10, a V2X packet may be received at a V2X layer of a UE. The V2X layer may receive the V2X packet and a corresponding PFI. The V2X layer may forward the V2X packet to an SDAP layer of the UE. The SDAP layer may map the V2X packet to a sidelink radio bearer. The sidelink radio bearer may include a PDCP layer of the UE. The PDCP layer may duplicate the V2X packet to form duplicated V2X packets when the duplicated V2X packets have different directional importance, but a same requirement in terms of priority, latency, reliability, and/or the like. The duplicated V2X packets may be associated with different directional ranges. The UE may select a transmission parameter (e.g., a precoder) to apply during transmission or retransmission of the duplicated V2X packets based at least in part on the directional ranges associated with the duplicated V2X packets, a bias (or bias importance) associated with the duplicated V2X packets, feedback received at the UE, and/or the like.

In some aspects, the PDCP layer may duplicate the V2X packet by forming duplicated PDCP PDUs associated with different directional ranges. For example, a duplicated PDCP PDU may be associated with a PQI and a specific directional range. Duplication of the V2X packet at the PDCP layer may have no or minimal impact on a V2X layer PC5 QoS handling and/or an SDAP layer radio bearer mapping.

As indicated above, FIG. 10 is provided as an example. Other examples may differ from what is described with regard to FIG. 10.

Figure 11:
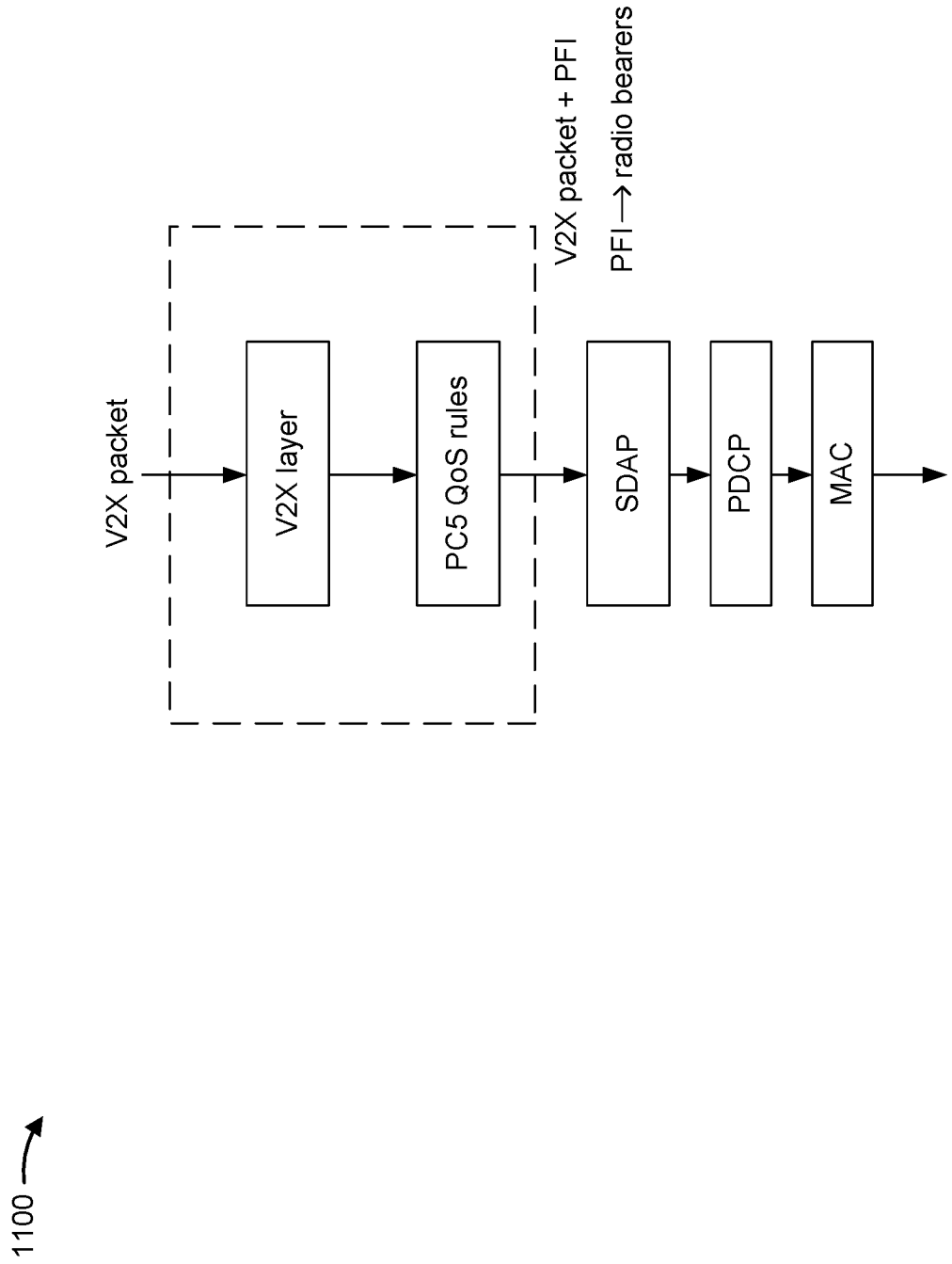

FIG. 11 is a diagram illustrating an example 1100 associated with duplication of packets associated with directional ranges, in accordance with various aspects of the present disclosure.

As shown in FIG. 11, a V2X packet may be received at a V2X layer of a UE. The V2X layer may receive the V2X packet and a corresponding PFI. The V2X layer may forward the V2X packet to an SDAP layer of the UE. The SDAP layer may map the V2X packet to a sidelink radio bearer. The sidelink radio bearer may include a MAC layer of the UE. The MAC layer may duplicate the V2X packet to form duplicated V2X packets. The duplicated V2X packets may be associated with different directional ranges.

In some aspects, the UE may establish different HARQ processes for the different directional ranges associated with the duplicated V2X packets. For example, the UE may establish a first HARQ process for a first directional range associated with the duplicated V2X packets, a second HARQ process for a second directional range associated with the duplicated V2X packets, and/or the like. The different HARQ processes may be associated with transmission parameters, such as an associated transmit precoder, power split information, and/or the like, where the transmission parameters may be based at least in part on the different directional ranges associated with the duplicated V2X packets.

In some aspects, the MAC layer may duplicate the V2X packet by forming duplicated MAC PDUs associated with different directional ranges. The duplicated MAC PDUs may be of a same V2X packet, but may be associated with the different directional ranges. In some cases, when HARQ combining is to be performed at the MAC layer, the MAC PDUs may be tagged to a same MAC PDU group. The MAC PDUs may be tagged to the same MAC PDU group to indicate that HARQ combining may be performed among HARQ processes within the MAC PDU group. By duplicating the V2X packet at the MAC layer, HARQ combining may be achieved among duplicated MAC PDUs associated with different directional ranges and/or different transmission parameters (e.g., different precoders).

As indicated above, FIG. 11 is provided as an example. Other examples may differ from what is described with regard to FIG. 11.

Figure 12:
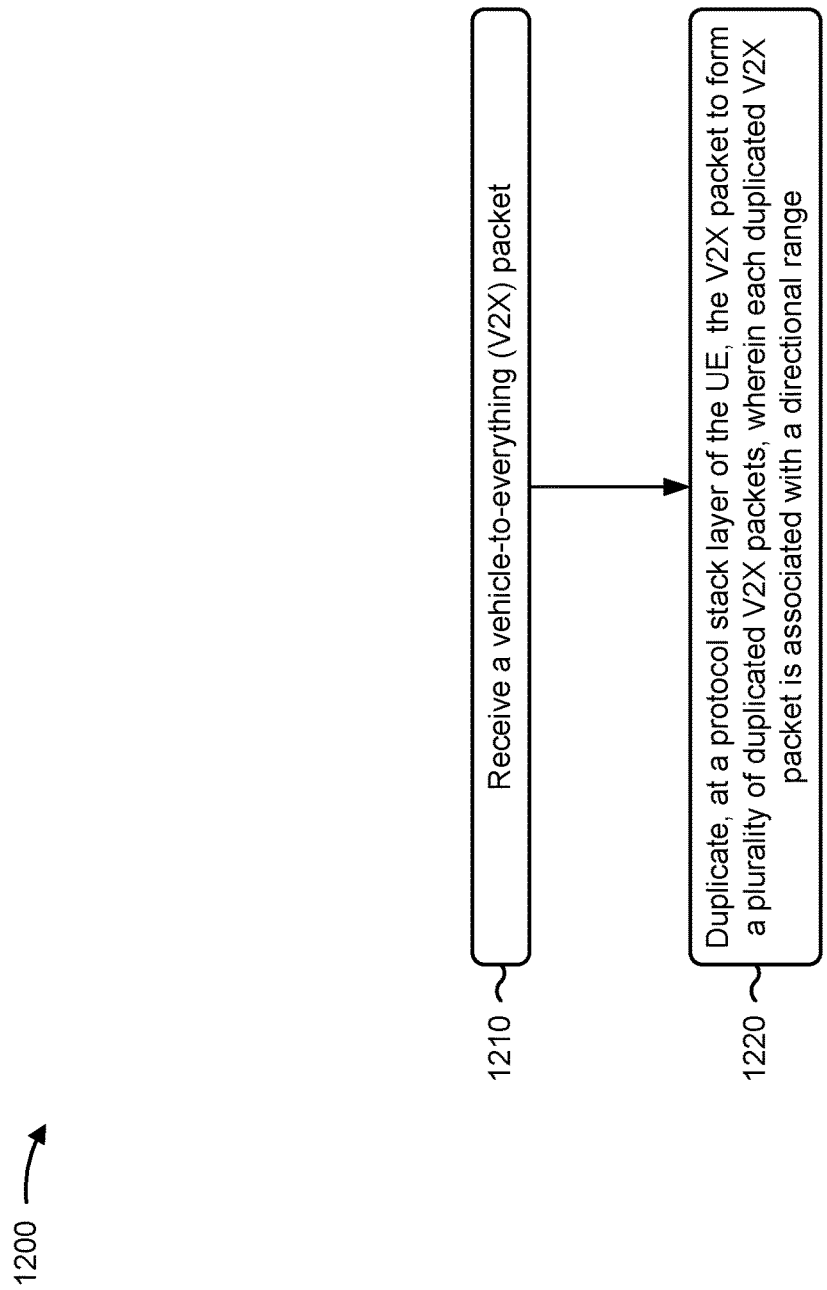
FIG. 12 is a diagram illustrating an example process associated with duplication of packets associated with directional ranges, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120) performs operations associated with duplication of packets associated with directional ranges.

As shown in FIG. 12, in some aspects, process 1200 may include receiving a V2X packet (block 1210). For example, the UE (e.g., using antenna 252, demodulator 254, MIMO detector 256, receive processor 258, controller/processor 280, and/or memory 282) may receive a V2X packet, as described above.

As further shown in FIG. 12, in some aspects, process 1200 may include duplicating, at a protocol stack layer of the UE, the V2X packet to form a plurality of duplicated V2X packets, wherein each duplicated V2X packet is associated with a directional range (block 1220). For example, the UE (e.g., using antenna 252, demodulator 254, MIMO detector 256, receive processor 258, transmit processor 264, TX MIMO processor 266, modulator 254, controller/processor 280, and/or memory 282) may duplicate, at a protocol stack layer of the UE, the V2X packet to form a plurality of duplicated V2X packets, wherein each duplicated V2X packet is associated with a directional range, as described above.

Process 1200 may include additional aspects, such as any single aspect or any combination of aspects described below and/or in connection with one or more other processes described elsewhere herein.

In a first aspect, duplicating, at the protocol stack layer of the UE, the V2X packet to form the plurality of duplicated V2X packets comprises duplicating the V2X packet at a V2X layer of the UE.

In a second aspect, alone or in combination with the first aspect, process 1200 comprises providing the plurality of duplicated V2X packets to different PFIs, wherein each PFI is associated with a unique set of QoS parameters and a unique directional range.

In a third aspect, alone or in combination with one or more of the first and second aspects, the set of QoS parameters comprises at least a packet priority, reliability, latency, or a combination thereof, for the directional range.

In a fourth aspect, alone or in combination with one or more of the first through third aspects, the PFIs include a first PFI associated with a first directional range and a second PFI associated with a second directional range, wherein the first directional range is associated with a first direction of the UE and the second directional range is associated with a second direction of the UE.

In a fifth aspect, alone or in combination with one or more of the first through fourth aspects, duplicating the V2X packet to form the plurality of duplicated V2X packets comprises duplicating the V2X packet to different PFIs to differentiate a directional importance of the V2X packets.

In a sixth aspect, alone or in combination with one or more of the first through fifth aspects, duplicating, at the protocol stack layer of the UE, the V2X packet to form the plurality of duplicated V2X packets comprises duplicating the V2X packet at a PDCP layer of the UE.

In a seventh aspect, alone or in combination with one or more of the first through sixth aspects, process 1200 comprises selecting the protocol stack layer of the UE based at least in part on a directional priority associated with the V2X packet or HARQ combining to be performed by the UE for the duplicated V2X packets.

In an eighth aspect, alone or in combination with one or more of the first through seventh aspects, process 1200 comprises providing the plurality of duplicated V2X packets to a single PFI, wherein the single PFI is associated with a set of QoS parameters, and each duplicated V2X packet is associated with a unique directional range.

In a ninth aspect, alone or in combination with one or more of the first through eighth aspects, process 1200 comprises transmitting HARQ feedback based at least in part on the directional range associated with the duplicated V2X packet.

In a tenth aspect, alone or in combination with one or more of the first through ninth aspects, duplicating, at the protocol stack layer of the UE, the V2X packet to form the plurality of duplicated V2X packets comprises duplicating the V2X packet at a MAC layer of the UE.

In an eleventh aspect, alone or in combination with one or more of the first through tenth aspects, process 1200 comprises associating the plurality of duplicated V2X packets with a MAC PDU group, and combining HARQ feedback among one or more HARQ processes associated with a MAC PDU group, wherein an indication of the MAC PDU group to be combined is received via an upper layer of the UE.

In a twelfth aspect, alone or in combination with one or more of the first through eleventh aspects, combining the HARQ feedback comprises performing HARQ combining for duplicated V2X packets associated with different precoders, wherein the different precoders are selected based at least in part on the directional range associated with the duplicated V2X packets.

In a thirteenth aspect, alone or in combination with one or more of the first through twelfth aspects, process 1200 comprises assigning a HARQ process for each directional range associated with the plurality of duplicated V2X packets.

In a fourteenth aspect, alone or in combination with one or more of the first through thirteenth aspects, process 1200 includes selecting one or more transmission parameters based at least in part on the directional range associated with the duplicated V2X packet, wherein the one or more transmission parameters include at least a precoder, power split information, or a combination thereof, and transmitting, using the one or more transmission parameters, the plurality of duplicated V2X packets to one or more second UEs.

In a fifteenth aspect, alone or in combination with one or more of the first through fourteenth aspects, transmitting the plurality of duplicated V2X packets comprises performing retransmissions of the plurality of duplicated V2X packets.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a vehicle-to-everything (V2X) packet; and
   duplicating, at a protocol stack layer of the UE, the V2X packet to form a plurality of duplicated V2X packets, wherein each duplicated V2X packet is associated with a directional range.

2. The method of claim 1, wherein:
   duplicating, at the protocol stack layer of the UE, the V2X packet to form the plurality of duplicated V2X packets comprises duplicating the V2X packet at a V2X layer of the UE.

3. The method of claim 1, further comprising:
   providing the plurality of duplicated V2X packets to different PC5 quality of service (QOS) flow identifiers (IDs) (PFIs), wherein each PFI, of the different PFIs, is associated with a unique set of QoS parameters and a unique directional range.

4. The method of claim 3, wherein the unique set of QoS parameters comprises at least: a packet priority, reliability, latency, or a combination thereof, for the directional range.

5. The method of claim 3, wherein the different PFIs include a first PFI associated with a first directional range and a second PFI associated with a second directional range, wherein the first directional range is associated with a first direction of the UE and the second directional range is associated with a second direction of the UE.

6. The method of claim 3, wherein duplicating the V2X packet to form the plurality of duplicated V2X packets comprises duplicating the V2X packet to the different PFIs to differentiate a directional importance of the plurality of duplicated V2X packets.

7. The method of claim 1, wherein:
   duplicating, at the protocol stack layer of the UE, the V2X packet to form the plurality of duplicated V2X packets comprises duplicating the V2X packet at a packet data convergence protocol (PDCP) layer of the UE.

8. The method of claim 1, further comprising:
   selecting the protocol stack layer of the UE based at least in part on a directional priority associated with the V2X packet or hybrid automatic repeat request (HARQ) combining to be performed by the UE for the plurality of duplicated V2X packets.

9. The method of claim 1, further comprising:
   providing the plurality of duplicated V2X packets to a single PC5 quality of service (QOS) flow identifier (ID) (PFI), wherein the single PFI is associated with a set of QoS parameters, and each duplicated V2X packet is associated with a unique directional range.

10. The method of claim 1, further comprising:
    transmitting hybrid automatic repeat request (HARQ) feedback based at least in part on the directional ranges associated with the plurality of duplicated V2X packets.

11. The method of claim 1, wherein:
    duplicating, at the protocol stack layer of the UE, the V2X packet to form the plurality of duplicated V2X packets comprises duplicating the V2X packet at a media access control (MAC) layer of the UE.

12. The method of claim 11, further comprising:
    associating the plurality of duplicated V2X packets with a MAC packet data unit (PDU) group; and combining hybrid automatic repeat request (HARQ) feedback among one or more HARQ processes associated with a MAC PDU group, wherein an indication of the MAC PDU group to be combined is received via an upper layer of the UE.

13. The method of claim 12, wherein combining the HARQ feedback comprises performing HARQ combining for duplicated V2X packets associated with different precoders, wherein the different precoders are selected based at least in part on the directional range associated with the duplicated V2X packets.

14. The method of claim 1, further comprising:
assigning a hybrid automatic repeat request (HARQ) process for each directional range associated with the plurality of duplicated V2X packets.

15. The method of claim 1, further comprising:
selecting one or more transmission parameters based at least in part on the directional ranges associated with the plurality of duplicated V2X packets, wherein the one or more transmission parameters include at least: a precoder, power split information, or a combination thereof; and
transmitting, using the one or more transmission parameters, the plurality of duplicated V2X packets to one or more second UEs.

16. The method of claim 15, wherein transmitting the plurality of duplicated V2X packets comprises performing retransmissions of the plurality of duplicated V2X packets.

17. A user equipment (UE) for wireless communication, comprising:
a memory; and
one or more processors operatively coupled to the memory, the memory and the one or more processors configured to:
receive a vehicle-to-everything (V2X) packet; and
duplicate, at a protocol stack layer of the UE, the V2X packet to form a plurality of duplicated V2X packets, wherein each duplicated V2X packet is associated with a directional range.

18. The UE of claim 17, wherein:
duplicate, at the protocol stack layer of the UE, the V2X packet to form the plurality of duplicated V2X packets comprises duplicating the V2X packet at a V2X layer of the UE.

19. The UE of claim 17, wherein the one or more processors are further configured to:
provide the plurality of duplicated V2X packets to different PC5 quality of service (QOS) flow identifiers (IDs) (PFIs), wherein each PFI, of the different PFIs, is associated with a unique set of QoS parameters and a unique directional range.

20. The UE of claim 19, wherein the unique set of QoS parameters comprises at least: a packet priority, reliability, latency, or a combination thereof, for the directional range.

21. The UE of claim 19, wherein the different PFIs include a first PFI associated with a first directional range and a second PFI associated with a second directional range, wherein the first directional range is associated with a first direction of the UE and the second directional range is associated with a second direction of the UE.

22. The UE of claim 19, wherein the one or more processors, when duplicating the V2X packet to form the plurality of duplicated V2X packets, are configured to duplicate the V2X packet to the different PFIs to differentiate a directional importance of the plurality of duplicated V2X packets.

23. The UE of claim 17, wherein:
duplicate, at the protocol stack layer of the UE, the V2X packet to form the plurality of duplicated V2X packets comprises duplicating the V2X packet at a packet data convergence protocol (PDCP) layer of the UE.

24. The UE of claim 17, wherein the one or more processors are further configured to:
select the protocol stack layer of the UE based at least in part on a directional priority associated with the V2X packet or hybrid automatic repeat request (HARQ) combining to be performed by the UE for the plurality of duplicated V2X packets.

25. The UE of claim 17, wherein the one or more processors are further configured to:
provide the plurality of duplicated V2X packets to a single PC5 quality of service (QOS) flow identifier (ID) (PFI), wherein the single PFI is associated with a set of QoS parameters, and each duplicated V2X packet is associated with a unique directional range.

26. The UE of claim 17, wherein the one or more processors are further configured to:
transmit hybrid automatic repeat request (HARQ) feedback based at least in part on the directional ranges associated with the plurality of duplicated V2X packets.

27. The UE of claim 17, wherein:
duplicate, at the protocol stack layer of the UE, the V2X packet to form the plurality of duplicated V2X packets comprises duplicating the V2X packet at a media access control (MAC) layer of the UE.

28. The UE of claim 27, wherein the one or more processors are further configured to:
associate the plurality of duplicated V2X packets with a MAC packet data unit (PDU) group; and
combine hybrid automatic repeat request (HARQ) feedback among one or more HARQ processes associated with a MAC PDU group, wherein an indication of the MAC PDU group to be combined is received via an upper layer of the UE.

29. The UE of claim 28, wherein combining the HARQ feedback comprises performing HARQ combining for duplicated V2X packets associated with different precoders, wherein the different precoders are selected based at least in part on the directional range associated with the duplicated V2X packets.

30. The UE of claim 17, wherein the one or more processors are further configured to:
assign a hybrid automatic repeat request (HARQ) process for each directional range associated with the plurality of duplicated V2X packets.

31. The UE of claim 17, wherein the one or more processors are further configured to:
select one or more transmission parameters based at least in part on the directional ranges associated with the plurality of duplicated V2X packets, wherein the one or more transmission parameters include at least: a precoder, power split information, or a combination thereof; and
transmit, using the one or more transmission parameters, the plurality of duplicated V2X packets to one or more second UEs.

32. The UE of claim 31, wherein the one or more processors, when transmitting the plurality of duplicated V2X packets, are configured to perform retransmissions of the plurality of duplicated V2X packets.

33. A non-transitory computer-readable medium storing a set of instructions for wireless communication, the set of instructions comprising:

one or more instructions that, when executed by one or more processors of a user equipment (UE), cause the UE to:

receive a vehicle-to-everything (V2X) packet; and duplicate, at a protocol stack layer of the UE, the V2X packet to form a plurality of duplicated V2X packets, wherein each duplicated V2X packet is associated with a directional range.

34. The non-transitory computer-readable medium of claim 33, wherein the one or more instructions cause the UE to:

duplicate the V2X packet at a V2X layer of the UE.

35. An apparatus for wireless communication, comprising:

means for receiving a vehicle-to-everything (V2X) packet; and means for duplicating, at a protocol stack layer of the apparatus, the V2X packet to form a plurality of duplicated V2X packets, wherein each duplicated V2X packet is associated with a directional range.

* * * * *